Sept. 11, 1956     R. H. BREEBACK     2,762,545
FILLING SYSTEM
Filed June 3, 1954
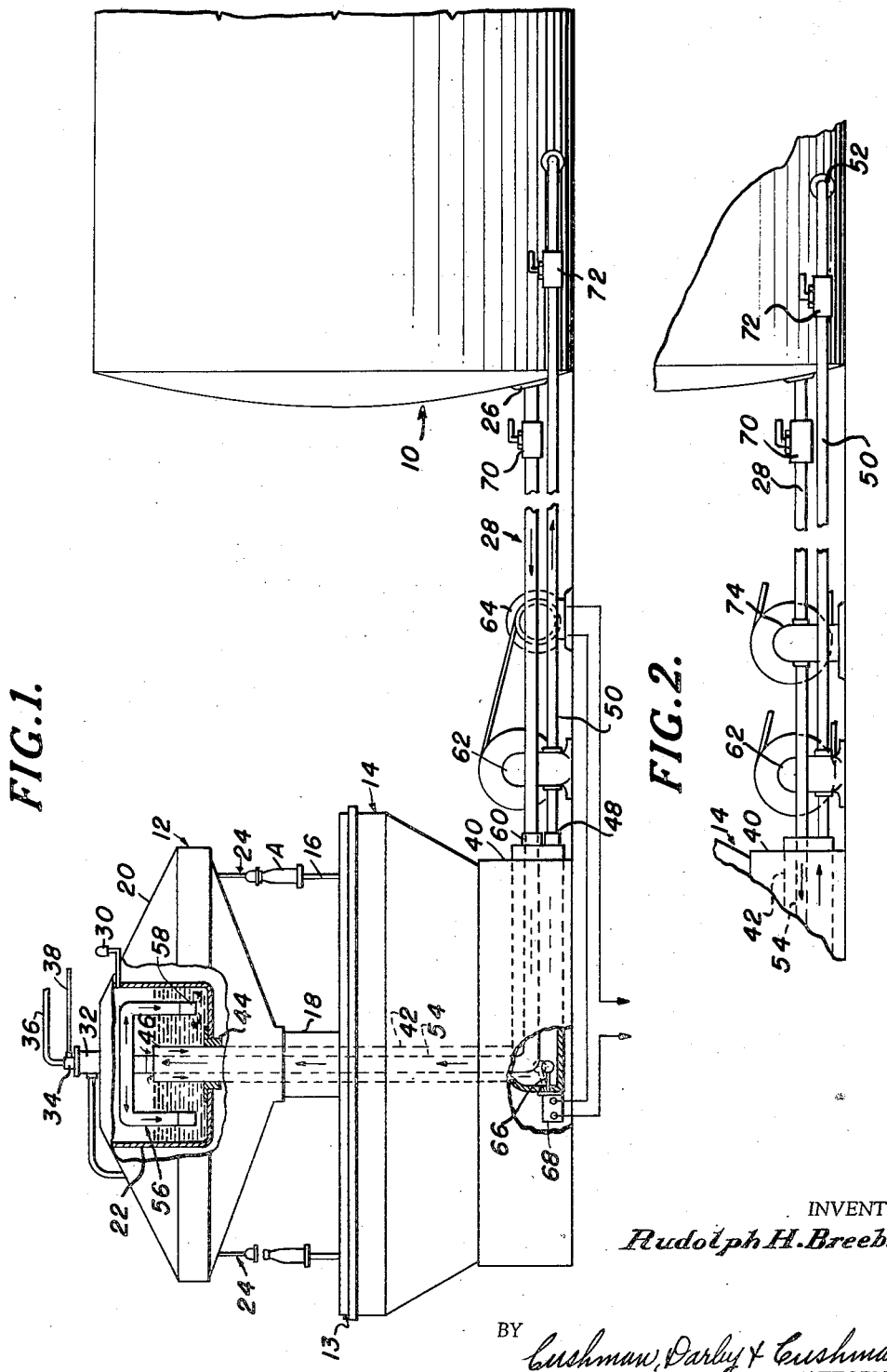
INVENTOR
*Rudolph H. Breeback*
BY *Cushman, Darby & Cushman*
ATTORNEYS

United States Patent Office 2,762,545
Patented Sept. 11, 1956

2,762,545

FILLING SYSTEM

Rudolph H. Breeback, Baltimore, Md., assignor to Crown Cork & Seal Company, Inc., Baltimore, Md., a corporation of New York Application June 3, 1954, Serial No. 434,282

14 Claims. (Cl. 226—96)

The present invention relates to a filling system and, more particularly to a system for recycling beer or other carbonated liquids between a storage tank and a filling machine.

Although the present invention will be described hereinafter as relating to a beer system for recycling beer between a government storage tank and a filling machine, while the filling machine is operative or inoperative, it is within the scope of the present inventon that other carbonated liquids such as soft drinks or the like, could be used in this system.

Heretofore, beer has been transferred from the government storage tank to the reservoir of the filling machine upon demand of the filling machine by pumps or utilization of differential pressure between the beer in the government storage tank and the pressure of gas superposing the beer in the reservoir of the filling machine. The level of beer in the filling machine was maintained within minimum and maximum levels and, consequently, it was necessary to accurately control the flow of beer into the filling machine reservoir so that the reservoir would not be under or over-filled when the filling machine was in operation. Secondly, flow of beer to the filling machine had to be stopped when the filling machine was inoperative. The starting and stopping of the flow of beer in the beer delivery line to the filling machine oftentimes caused surges and churning of the beer in the line. Beer, being an unstable liquid because of its carbonation, would sometimes foam when it flowed into the reservoir because of the sudden starting or stopping of the flow.

Therefore, an object of the present invention is the provision of a filling system and method whereby beer can be continuously flowed into the reservoir of the filling machine thereby eliminating surges and churning of the beer which result in foaming when the beer is discharged in the reservoir of the filling machine.

Another object of the present invention is the provision of a filling system and method wherein beer can be recycled between the storage tank and the filling machine when the filling machine is in operation.

A still further object of the present invention is the provision of a filling system and method wherein beer can be continuously recycled between the storage tank and the filling machine when the filling machine is inoperative, thereby insuring cool beer in the reservoir at all times.

A further object of the present invention is the provision of a method and system wherein beer being recycled from the storage tank to the reservoir of the filling machine and back to the storage tank utilizes a pump in the beer return flow line positioned adjacent the filling machine. By positioning the pump adjacent the filling machine, the pump can be accurately controlled to pump beer back to the storage tank only when the influx of beer to the reservoir is greater than the efflux of beer from the reservoir to the containers being filled.

Still another object of the present invention is the provision of a method and filling system wherein beer being returned from the reservoir of a filling machine to the storage tank is utilized to insulate or shield beer flowing into the reservoir of the filling machine.

A still further object of the present invention is the provision of a method and system wherein the temperature of the beer in the reservoir of a filling machine is maintained substantially constant to that of the beer within the storage tank without the need of special refrigeration equipment.

Another object of the present invention is the provision of a method and filling system wherein the beer in the reservoir of a filling machine will not become flat when the filling machine is shut down.

These and other objects of the invention will be more apparent from the following specification, claims and drawings in which:

Figure 1 is a schematic view of the filling system of the present invention, and Figure 2 is a schematic view of a modified form of filling system, portions of the filling machine and the government tank which are the same as in Figure 1 being omitted.

Referring specifically to the drawings, the system comprises generally a government storage tank 10 and a filling machine generally indicated at 12. Storage tank 10 is one of a number of tanks usually located in the brewery at a remote distance from filling machine 12. Beer is aged and stored in storage tank 10 and after the beer has been aged a sufficient period of time according to Government regulations, the tank can be opened and beer drained therefrom for filling into containers or kegs. In the present invention, tank 10 is shown connected to a filling machine 12 of the type for continuously filling cylindrical containers A such as bottles or cans.

As shown in Figure 1 of the drawings, filling machine 12 is of the rotary type, now commonly used in breweries or soft drink plants. Filling machine 12 generally includes a stationary base frame or table member 40, a vertical column 18, and a rotary structure 13 mounted on column 18. Rotary structure 13 includes a rotating container supporting table 14 and an upper rotating turret generally indicated at 20. Container supporting table 14 is provided adjacent its periphery, with a plurality of vertically movable container supporting platforms 16. Upper rotating turret 20 includes a beer reservoir 22 and a plurality of filling heads 24 positioned in vertical alignment with each of the container supporting platforms 16. Containers A are fed to the machine by any suitable conveyor (not shown) and are successively positioned on platforms 16 as the platforms rotate by the infeed station of the machine. After a container has been positioned on one of the platforms, it will be raised vertically into engagement with the filling head 24 which is in vertical alignment therewith. The filling valves (not shown) of filling heads 24 are opened and the containers are filled with beer from reservoir 22. After the containers A are filled with beer, they are lowered away from filling heads 24 and are transferred from filling machine 12 to a conveyor (not shown) where they are conveyed to suitable container closing mechanism.

As has been previously mentioned, filling machine 12 is of the rotary type and, consequently, table 14 and upper turret 20, including reservoir 22, will rotate on vertical column 18. Reservoir 22 positioned within the shell of upper turret 20 is substantially air-tight and is provided with a pressure relief valve 30 which is set to relieve pressure of the gas superposed on the beer within the reservoir 22 at any desired value. Mounted centrally or rotating turret 20 is a collar 32 which rotates with the reservoir and upper turret. Disposed centrally of collar 32 is a stationary fitting 34. Stationary fitting 34 has a passage therein which communicates with a passage in collar 32 leading to the interior of the reservoir. Through this passage carbon dioxide gas can be fed to the reservoir through a pipe 36 connected to fitting 34. This carbon dioxide gas is used to maintain a constant pressure on the beer in the reservoir, as well as a source for counter-pressure of the containers. Pipe 36 is connected to any suitable source of carbon dioxide gas through a control panel (not shown) of the machine. Suitable pressure regulators may be provided in the control panel to control the pressure of carbon dioxide gas being delivered to the area in the reservoir above the beer therein.

If desired, a vent control line 38, such as described in the application of Carl L. Day and Rudolph H. Breeback for Filling Machine, 248,722, filed Sepetmber 28, 1951, now Patent No. 2,692,075, issued November 19, 1954 may be connected to stationary fitting 34. As disclosed in the aforementioned application, when the machine is stopped, the vent control system will be effective to prevent liquid from flowing into the containers in the reservoir. In more detail, the venting passage of each filling head can be closed so that pressure will build up in the containers and liquid will not be able to flow by gravity from the reservoir 22.

Stationary base frame or table 40 houses suitable driving mechanisms for rotating rotary structure 13. Extending upwardly from base 40 through central column 18 into reservoir 22 is a vertical tube or conduit 42. The end of tube 42 which extends into reservoir 22 is adapted to be received in a suitable bearing and seal, generally indicated at 44, so that reservoir 22 can rotate with respect to the tube. The upper end 46 of tube 42 is positioned vertically a sufficient distance above the bottom of reservoir 22 so as to determine the maximum level of beer within the reservoir. The lower end of tube 42, which is positioned within base member 40, extends at a 90° angle to the vertical portion thereof. Connected to the outlet 48 of the lower portion of tube 42 is a pipe or conduit 50 which leads to an inlet 52 (Figure 2) on storage tank 10.

Positioned concentric of and within tube 42 is a second tube or conduit 54 which will hereinafter be referred to as the inner tube. Inner tube 54 extends upwardly into reservoir 22 where its upper end terminates above the upper end of outer tube 42. Mounted on the upper end of inner tube 54 is a distributor head 56 which consists of a plurality of pipes extending radially and then downwardly into the reservoir to a position below the upper edge of tube 42. Any number of nozzles 58 may be provided as outlets on distributor head 56 depending on the quantity of beer being flowed in reservoir 22. It will be noted that nozzles 58 of distributor head 56 discharge the beer beneath the surface of beer in reservoir 22 thereby reducing the chance of beer foaming in reservoir 22. The lower portion of conduit or tube 54 which is also concentric with the lower portion of tube 42 extends radially out of the base 40 of filling machine 12. Connected to its end 60 is a pipe or conduit 28 which is commonly known as the beer delivery line. The other end of beer delivery line 28 is connected to an outlet fitting 26 provided on storage tank 10.

Concentric tubings 42 and 54 define inner and outer beer flow passages. The inner beer flow passage, which is the passage through tube 54, is for beer delivery to reservoir 22 while the outer beer flow passage, which is between tubes 42 and 54, is for beer return. Of course, the outer beer flow passage must be of such area as to accommodate returning beer at the same rate of flow as the beer being delivered to reservoir 22. In other words, if filling machine 12 is not operating, the beer passage between tubing 42 and 54 must be able to return beer from the reservoir to the storage tank as fast as the beer is being supplied to the reservoir so that there will be no chance of the reservoir over-filling. It will now be evident that beer from tank 10 can flow through beer delivery line 28 into inner tube 54 and be distributed within reservoir 22 by distributor head 56. Beer in excess of the beer which is being delivered to containers A will flow over the upper end 46 of tube 42 and be returned therethrough to the beer return line 50 where the beer is transferred back to storage tank 10. A more detailed description of this operation will follow in the specification when other aspects of the system have been described.

Mounted adjacent filling machine 12 in beer return line 50 as close to the outlet 48 as practical, is a positive displacement and variable speed pump 62. Pump 62 is driven by an electric motor 64, the control of which is determined by the beer in the beer flow passage between tubing 54 and 42. Any suitable means to determine if beer is in this passage may be utilized to control operation of pump 62. As shown in Figure 1, a float 66 can be positioned at the lowermost point in tube 42 and float 66 in turn can be connected to a switch 68 which will control the supply of electric current to motor 64. Conesquently, when there is no beer in the line 42, the electric circuit to motor 64 is broken by switch 68 being opened and pump 62 will not be operated. On the other hand, if there is sufficient beer in the outer passage to return to tank 10, float 66 will rise closing switch 68 and starting the motor operated pump 62. Electric probes, which are well known in the art, and in the past have been used for determining level of liquid in tanks, could be used in place of the float actuated switch 68.

Beer delivery line 28 and beer return line 50 may be provided with shut-off valves 70 and 72 respectively, so that when it is desired to clean the filling machine and lines thereto after a period of operation, beer from the tank 10 can be shut-off from the rest of the system.

In the system disclosed in Figure 1 of the drawing, pressure of the carbon dioxide gas above the beer in reservoir 22 is maintained substantially constant by means of pressure relief valve 30. The pressure of carbon dioxide gas in the reservoir of a high speed rotary type filling machine is normally maintained at approximately 10 pounds per square inch. Where the pressure of beer in the storage tank 10 is higher than the pressure on the beer in reservoir 22, no pump is needed in beer delivery line 28. The differential of pressure between the beer in tank 10 and the carbon dioxide gas in reservoir 22 is utilized to cause flow in the beer delivery line, thus, transferring beer from tank 10 to the reservoir 22. Normally the pressure of beer in tank 10 will be at least 13 pounds per square inch or more depending upon the static head of the beer in the tank.

In some instances where the pressure in the reservoir 22 is higher than the pressure of the beer in tank 10, such as the case where tank 10 is located in the brewery below the level of the filling machine, it is necesary to utilize a positive displacement variable speed pump 74 in line 28, such as disclosed in Figure 2. In this instance pump 74 will be continuously operated to cause flow of beer through beer delivery line 28 into the reservoir 22 of filling machine 12.

The operation of the system is as follows:

To initially put the system in condition for operation, shut-off valves 70 and 72 are first opened. In the system disclosed in Figure 1, the differential in pressure between pressure of beer in tank 10 and the pressure of gas in reservoir 22 will cause continuous flow of beer through beer delivery line 28 upwardly through the beer flow passage in tube 54 into the distributor head 56 where it is evenly and smoothly distributed to the interior of reservoir 22. Beer will continue to rise in reservoir 22 until it flows over the upper end 46 of outer tube 42. In any event, as soon as a sufficient amount of beer is transferred into tank 22, the system is ready for operation. Filling machine 12 is started and containers are fed thereto and filled from beer within reservoir 22. The influx of beer which continuously flows through beer delivery line 28 into reservoir 22 will be of a quantity at least equal to or slightly greater than beer being removed from the reservoir while continuously filling successive containers A. Should there be a break in the container line or should the filling machine be shut down for lunch or overnight, as previously stated, beer will continue to flow into reservoir 22. However, because filling machine 12 will not be delivering beer to containers in such instances, beer will build up on the reservoir and flow over the wall 46 into tubing 42. When there is a sufficient quantity in tubing 42, float 66 will rise closing switch 68 and completing the circuit to the electric motor of pump 62. Pump 62 then operates to cause the flow of beer through beer return line 50 back into storage tank 10. In other words, when the filling machine is stopped for any period of time, beer will be continuously recycled between tank 10 and reservoir 22 of filling machine 12. On the other hand, even during operation of the filling machine, beer will be recycled through the system. This condition would arise when the influx of beer to reservoir 22 is greater then efflux of beer to containers being filled.

By recycling beer through the system, reservoir 22 is always provided with a cool beer from storage tank 10 and, consequently, there will always be a full reservoir and no delay in starting of filling machine 12. Further, it will be noted that another advantage of the present system is that the beer delivery line through the filling machine is concentric of the beer return line and, thus, the cool beer coming into the machine is insulated from the heat of the machine and surrounding atmosphere by the beer returning through the concentric tubing 42. By keeping the beer cool, there is less opportunity for the beer to become "wild" and foam. Providing a continuous gentle flow of beer into reservoir 22 of filling machine 12 eliminates churning and agitation of beer in beer delivery line 50, which oftentimes results in foam when the beer is delivered to the reservoir.

The system disclosed in Figure 2 differs from that disclosed in Figure 1 only in that a positive displacement variable speed pump 74 is provided in beer delivery line 28. The system in Figure 2 requires that pump 74 be continuously operated so that there may be continuous flow of beer through beer delivery line 28. Pump 62 in beer return line 50 will operate in the manner just previously described with reference to operation of the system disclosed in Figure 1.

The terminology used in the specification is for the purpose of description and not limitation, the scope of the invention being defined in the claims.

I claim:

1. In a filling system for a carbonated liquid, a storage tank for a source of supply of carbonated liquid, a filling machine for continuously filling a series of containers with the liquid, said filling machine having a reservoir for a body of the liquid and a superposed body of gas, means connecting said storage tank to the reservoir of said filling machine for supplying the liquid to the reservoir, means connecting said reservoir to said storage tank and including a pump for returning the liquid to said storage tank when the influx of liquid to said reservoir is greater than the efflux of carbonated liquid from said reservoir to the containers, and means responsive when the influx of carbonated liquid to said reservoir is greater than the efflux of liquid from said reservoir to the containers for operating said pump.

2. A filling system of the character described in claim 1 wherein the means for supplying carbonated liquid to the reservoir discharges the carbonated liquid in said reservoir substantially below the maximum level of liquid in said reservoir.

3. A filling system of the character described in claim 1 wherein the liquid in said reservoir is under a superposed body of gas at a predetermined pressure greater than atmosphere and the liquid in said storage tank is under a pressure greater than the pressure of gas in said reservoir thereby causing flow of liquid from said storage tank to said reservoir.

4. A filling system of the character described in claim 1 wherein the means connecting said storage tank to said reservoir for supplying liquid thereto is provided with a pump for inducing the flow of liquid.

5. In a filling system for a carbonated liquid, a storage tank for a supply of the carbonated liquid, a rotary filling machine for continuously filling a series of containers, said filling machine including a vertical column supporting a container supporting table and a superposed reservoir, concentric tubing including an inner tube and an outer tube extending upwardly through said vertical column into said reservoir, said concentric tubing defining inner and outer liquid flow passages, a conduit connecting the inner tube with said storage tank for supplying liquid therefrom to the reservoir of said filling machine through said inner passage, a second conduit connecting the outer tube to said storage tank for providing a return flow passage of liquid from said reservoir to said storage tank, means in said second conduit for transfering carrbonated liquid therein to said storage tank, and means responsive to the quantity of liquid in said outer passage for controlling the liquid transferring means in said second conduit.

6. A filling system of the character described in claim 5 wherein said liquid transferring means includes a pump positioned in said second conduit adjacent said filling machine and wherein said means responsive to the quantity of liquid in said outer passage is positioned in substantially the lowermost point of said outer passage.

7. A filling system of the character described in claim 5 wherein said outer tube terminates within and a distance from the bottom of said reservoir and determines the maximum level of liquid in said reservoir and wherein said inner tube discharges liquid into said reservoir below the maximum level of liquid in said reservoir.

8. A filling system of the character described in claim 5 wherein the end of said inner tubing extending into said reservoir is provided with a distributor head, said distributor head having at least one nozzle with its outlet end positioned below the inlet for said outer tube communicating with the interior of said reservoir.

9. In a filling system for carbonated liquid, a storage tank having carbonated liquid therein, a rotary filling machine for continuously filling a series of containers, said filling machine including a vertical column supporting a container supporting table and a superposed reservoir, the liquid in said reservoir being under a superposed body of gas at a predetermined pressure greater than atmosphere and the liquid in said storage tank being under a pressure greater than the pressure of the gas in said reservoir, fluid connecting means between said storage tank and said reservoir through which liquid in said storage tank will flow therefrom to said reservoir, an overflow pipe extending upwardly into said reservoir, said overflow pipe determining the maximum level of liquid in said reservoir and being connected to said storage tank for returning liquid from said reservoir to said storage tank when the influx of liquid into said reservoir is greater than the efflux of the liquid from said reservoir to the containers being filled, means for transferring liquid overflowing from said reservoir back into said storage tank against the pressure of liquid therein, and means responsive to the overflow of liquid from said reservoir for operating said last-mentioned liquid transferring means.

10. A method of supplying beer from a storage tank to the reservoir of a filling machine comprising maintaining gas in the reservoir of the filling machine at a predetermined substantially constant pressure, continuously flowing beer from the storage tank to the reservoir of the filling machine, filling containers with beer from the reservoir of the filling machine, utilizing a pump to transfer beer in said reservoir in excess of a predetermined quantity back to said storage tank, controlling the pumping action upon the excess of beer in said reservoir, and utilizing the beer flowing back to said storage tank to insulate beer flowing into said reservoir.

11. A method of supplying beer from a storage tank to the reservoir of a filling machine comprising maintaining gas in the reservoir at a predetermined substantially constant pressure less than the pressure on the beer in the storage tank, utilizing the differential of pressure between the beer in the storage tank and the gas in the reservoir to continuously flow beer from the storage tank to the reservoir, filling containers with beer from the reservoir, controlling the maximum level of beer continuously flowing into the reservoir, withdrawing beer directly from the reservoir in excess of the maximum level therein, utilizing a pump to transfer the beer withdrawn from the reservoir back to the storage tank, controlling the pumping action in accordance with the quantity of beer withdrawn from the filling machine reservoir.

12. In a filling system for a carbonated liquid, a storage tank having carbonated liquid therein, a rotary filling machine for continuously filling a series of containers, said filling machine including a vertical column supporting a container supporting table and a superposed reservoir, the liquid in said reservoir being under a superposed body of gas at a predetermined pressure, concentric tubing including an inner and an outer tube extending upwardly through said vertical column into said reservoir, said concentric tubing defining inner and outer liquid flow passages, a conduit connecting the inner of said tubing to said storage tank, a second conduit connecting the outer tube to said storage tank, a pump in one of said conduits for transferring liquid from said storage tank to said reservoir, a second pump in the other of said conduits for transferring liquid from said reservoir back to said storage tank, means responsive when the influx of liquid to said reservoir is greater than the efflux of liquid from said reservoir to the containers for controlling said second pump.

13. A method of supplying beer from a storage tank to the reservoir of a filling machine comprising maintaining a gas in the reservoir at a predetermined substantially constant pressure, utilizing a pump to continuously transfer beer from the storage tank to the reservoir against the pressure of gas in the reservoir, filling containers with beer from the reservoir, controlling the maximum of level of beer continuously flowing into the reservoir, withdrawing beer directly from the reservoir in excess of the maximum level therein, utilizing a second pump to transfer the withdrawn beer from the reservoir back to the storage tank, and controlling the pumping action of the second pump in response to the quantity of the beer withdrawn from the reservoir.

14. A method of supplying beer from a storage tank to the reservoir of a filling machine comprising maintaining gas in the reservoir of the filling machine at a predetermined substantially constant pressure, continuously flowing beer from the storage tank to the reservoir, filling containers with beer from the reservoir, controlling the maximum level of beer continuously flowing into the reservoir, withdrawing beer directly from the reservoir in excess of the maximum level therein, utilizing a pump to transfer the beer withdrawn from the reservoir back to the storage tank, controlling the pumping action in accordance with the quantity of beer withdrawn from the filling machine reservoir.

References Cited in the file of this patent
UNITED STATES PATENTS

| | | |
|---|---|---|
| 1,082,287 | Schaffer | Dec. 23, 1913 |
| 1,628,853 | Lomax | May 17, 1927 |
| 1,881,100 | Smith | Oct. 4, 1932 |
| 2,346,056 | Thompson | Apr. 4, 1944 |
| 2,547,481 | McDonald | Apr. 3, 1951 |